Figure 1:
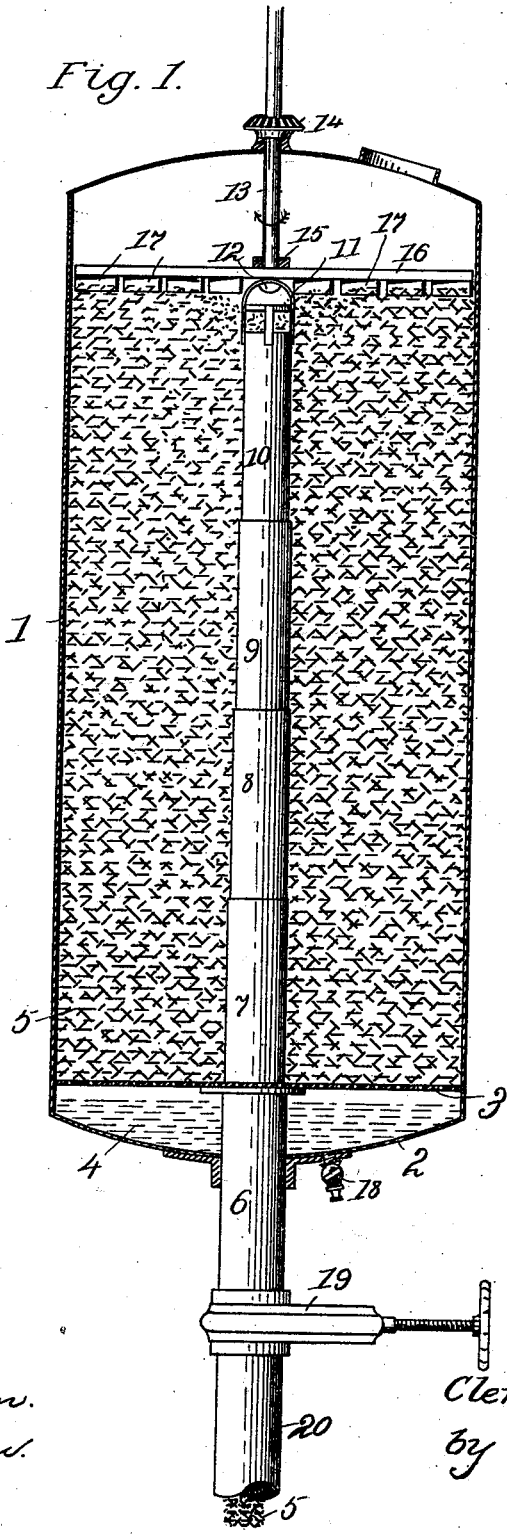

No. 670,582. Patented Mar. 26, 1901.
C. ERISMAN.
TANK AND MEANS FOR DISCHARGING CONTENTS THEREOF.
(Application filed Feb. 4, 1901.)
(No Model.) 2 Sheets—Sheet 1.

Witnesses
Nora Graham.
Ina Graham.

Inventor,
Clem Erisman.
by L. P. Graham
his attorney.

No. 670,582. Patented Mar. 26, 1901.
C. ERISMAN.
TANK AND MEANS FOR DISCHARGING CONTENTS THEREOF.
(Application filed Feb. 4, 1901.)
(No Model.) 2 Sheets—Sheet 2.
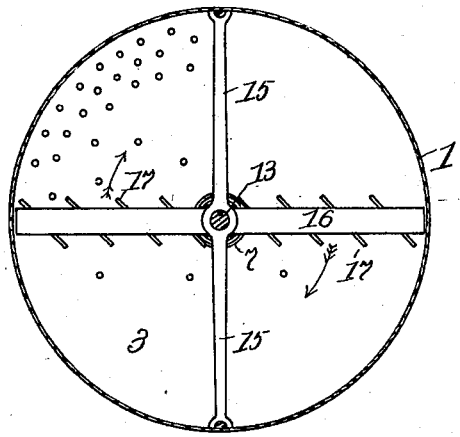
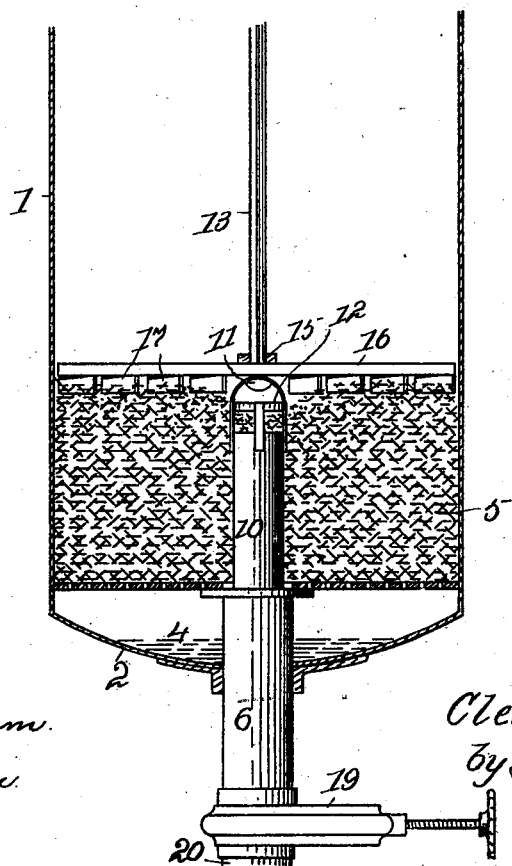
Witnesses.
Nora Graham.
Ina Graham.
Inventor
Clem Erisman
by L. P. Graham
his attorney

UNITED STATES PATENT OFFICE.

CLEM ERISMAN, OF DECATUR, ILLINOIS, ASSIGNOR TO FRANK M. PRATT, OF SAME PLACE.

TANK AND MEANS FOR DISCHARGING CONTENTS THEREOF.

SPECIFICATION forming part of Letters Patent No. 670,582, dated March 26, 1901.

Application filed February 4, 1901. Serial No. 45,985. (No model.)

*To all whom it may concern:*

Be it known that I, CLEM ERISMAN, of the city of Decatur, county of Macon, and State of Illinois, have invented a certain new and useful Tank and Means for Discharging the Contents Thereof, of which the following is a specification.

This invention provides means for discharging a somewhat compacted mass of divided material from tanks and like receptacles, and it is particularly adapted to the removal of meal from which oil has been extracted by the use of solvents. It is exemplified in the structure hereinafter described, and it is defined in the appended claims.

In the drawings forming part of this specification, Figure 1 is a central vertical section through a tank embodying my invention, showing the conditions that exist when the operation of discharging the contents of the tank is begun. Fig. 2 is a cross-section through an empty tank above the discharging mechanism thereof. Fig. 3 is a vertical section through the lower end of the tank, illustrating the conditions that exist when the tank is nearly empty.

The tank 1 may be of any proportions desired; but it is preferably cylindrical in cross-section. It has a bottom 2, and above the bottom some little distance is preferably placed a perforated disk or false bottom 3, which sustains the mass of solid particles and permits the solvent to percolate through and into the space 4, between the disk and the bottom 2. A tube 6 extends from disk 3 downward through the center of the bottom 2, and at the lower end of the tube is preferably placed a valve 19, which is in this instance a gate-valve. Below the valve a pipe 20 may continue in any direction and to any receptacle desired. A telescoping tube, composed of sections 7, 8, 9, and 10, reaches when extended to near the top of the tank and when lowered is contained in the tube 6. The tube 6 is larger than any of the sections of the telescoping tube, and each of the telescoping sections is smaller than the one next below it, so that when the entire telescope is lowered each section nests in another and all are contained in tube 6. The sections of the telescope are held against separation in any well-known manner, and at the upper end of section 10 is a bail 11, by means of which the telescope is elongated or shortened. The bail may be strengthened by a cage-like structure, as shown in the drawings, the frame of such cage being sufficiently open to permit free passage of meal or other material into the tube. A shaft 13 extends downward through the upper end of the tank, and it has on its lower end a head 12, that engages the bail 11. In operation the shaft rotates and moves lengthwise downward, and a gear-wheel, as 14, may be splined on the shaft above the upper end of the tank to impart the rotary motion and permit the lengthwise motion. The shaft is stayed at its lower end by a cross-arm 15, which slides up and down on ribs on opposite sides of the tank, as shown in Fig. 2, and a cross-arm 16 is fastened onto the shaft below the stay-bar 15. The cross-arm has a plurality of inclined blades 17 on its under surface, and the inclination of the blades is such that when the cross-arm is rotated in the direction indicated by the arrows in the drawings and the blades are lowered into contact with the material in the tank the upper layer of meal will be carried by centripetal action toward the mouth of the telescoping tube.

When the tank is used to extract oil from meal, the principal valve 19 is closed, as is also a drain-valve 18 for space 4, and the tank is filled with meal and submitted to the action of a solvent. Subsequently the valves are opened, and the oil and solvent are drawn off. Then the blades 17 are lowered into contact with the upper surface of the meal, the shaft is rotated and gradually lowered, and as the meal 5 is removed through the central tube the mouth of the tube is correspondingly lowered. After the telescoping sections are all lowered into tube 6 and the meal is all discharged from the tank the shaft is raised and the central tube extended preparatory to a repetition of the operation.

The central tube is made up of telescopic sections as a matter of convenience largely or for economy of space, and the general features of the invention are the same when a single long tube is lowered into another tube of suitable length or into the open air.

The specific means shown and described whereby the meal is forced toward the center of the tank is merely typical of this element of my invention. My mode of operation demands means for carrying the upper surface of the meal or other substance toward the central tube, and such means must lower as the meal is removed; but the construction of the discharging means is immaterial, and I do not restrict myself to any particular mechanism.

I claim—

1. A tank-discharger comprising a vertical tube extended through the bottom of the tank and having longitudinal motion therein, and mechanism at the upper end of the tube to draw the contents of the tank to the mouth of the tube as the tube is lowered.

2. A tank-discharger comprising a vertical tube extended through the bottom of the tank and having longitudinal motion therein, a rotatable and longitudinally-movable shaft extended into the upper end of the tank, a swivel connection between the lower end of the shaft and the upper end of the tube and mechanism driven by the shaft to force the contents of the tank toward the mouth of the tube.

3. The combination with a tank, of a tube connected with the lower end thereof and having a closure, a telescopic conduit adapted to nest in the tube in the bottom of the tank and extensible up into the tank, and mechanism at the upper end of the conduit to draw the contents of the tank toward the mouth of the conduit.

In testimony whereof I sign my name in the presence of two subscribing witnesses.

CLEM ERISMAN.

Witnesses:
 F. M. PRATT,
 NEWTON DAVIS.